United States Patent [19]
Kondo et al.

[11] Patent Number: 5,248,191
[45] Date of Patent: Sep. 28, 1993

[54] PRESSURE CONTROL VALVE FOR CONTINUOUS PRESSURE CONTROL TO WHEEL CYLINDER

[75] Inventors: Masuhiro Kondo, Chiryu; Kazutoshi Yogo; Hideo Wakata, both of Nagoya; Takahiro Goshima, Gifu; Masahiko Kamiya, Anjo, all of Japan

[73] Assignee: Nippondenso Co., Ltd., Kariya, Japan

[21] Appl. No.: 995,936

[22] Filed: Dec. 23, 1992

Related U.S. Application Data

[63] Continuation of Ser. No. 675,625, Mar. 27, 1991, abandoned.

[30] Foreign Application Priority Data

Mar. 27, 1990 [JP] Japan ................................ 2-79119
Jun. 28, 1990 [JP] Japan ................................ 2-171221

[51] Int. Cl.$^5$ ................................ B60T 8/36
[52] U.S. Cl. ................................ 303/117.1; 303/92; 303/119.2; 137/625.65
[58] Field of Search ................ 303/119.2, 115.2, 92, 303/117.1, 115.4, 116.1, 119.1, DIG. 1-4; 137/625.68

[56] References Cited

U.S. PATENT DOCUMENTS

| | | | |
|---|---|---|---|
| 3,682,513 | 8/1972 | Oberthur | 303/92 X |
| 4,844,119 | 7/1989 | Martinic | 303/119 SV X |
| 4,902,075 | 2/1990 | Uno et al. | 303/115 EC X |
| 4,915,459 | 4/1990 | Hashida et al. | 303/119 SV |
| 5,018,797 | 5/1991 | Takata | 303/117 |

FOREIGN PATENT DOCUMENTS

| | | | |
|---|---|---|---|
| 0138455 | 8/1982 | Japan | 303/119 SV |
| 1-90855 | 4/1989 | Japan | |
| 1-178062 | 7/1989 | Japan | |

Primary Examiner—Robert J. Oberleitner
Assistant Examiner—Josie A. Ballato
Attorney, Agent, or Firm—Cushman, Darby & Cushman

[57] ABSTRACT

A pressure control valve for use in an automobile braking system includes a spool slidably movable for providing selective fluid communication between a pressure fluid source, a wheel cylinder, and a reservoir. The spool has, or is associated with, a pressure-bearing member responsive to a fluid pressure from the wheel cylinder, for applying a first biasing force to the slidable member to urge the slidable member to a position in which the wheel cylinder and the reservoir communicates with each other. An electromagnetic coil responds to an electric signal for generating an electromagnetic force to urge the slidable member to the above position. The slidable member is normally biased by a spring under a second biasing force, greater than the first biasing force, to urge the slidable member to a position in which the pressure fluid source and the wheel cylinder communicate with each other. The fluid pressure in the wheel cylinder is regulated to cause the sum of the fluid pressure in the wheel cylinder and the electromagnetic force from the electromagnetic coil to counterbalance the second biasing force.

11 Claims, 6 Drawing Sheets

PRESSURE CONTROL VALVE FOR CONTINUOUS PRESSURE CONTROL TO WHEEL CYLINDER

This is a continuation of application Ser. No. 07/675,625, filed on Mar. 27, 1991, which was abandoned on Dec. 23, 1992.

FIELD OF THE INVENTION

The present invention relates to a pressure control valve for use in an automobile braking system, which pressure control valve is capable of continuously controlling a hydraulic brake pressure supplied to a wheel cylinder of the automobile braking system.

DESCRIPTION OF THE PRIOR ART

Japanese Laid-Open Patent Publication No. 1(1989)-178062, for example, discloses a proportional solenoid-operated pressure regulating valve for use in an automobile braking system. The disclosed pressure regulating valve includes a housing having inlet ports connected to hydraulic pumps of the automobile braking system, output ports connected to wheel cylinders, and a relief port connected to a reservoir. The pressure regulating valve also includes spools slidably disposed in the housing for establishing selective communication between the various ports when axially moved by the combination of propulsive forces produced by linear solenoids mounted on the housing and hydraulic brake pressures from the wheel cylinders. The hydraulic brake pressures applied to the wheel cylinders can be controlled in proportion to electric currents supplied to the linear solenoids.

Since, however, the hydraulic brake pressures applied to the wheel cylinders are proportional to the electric currents supplied to the wheel cylinders, the wheel cylinders will not be supplied with any hydraulic brake pressures if no electric signal is supplied to the linear solenoids. Stated otherwise, in the event of an electric failure, such as a wire disconnection, of the linear solenoids or the electric signal transmission system of the automobile braking system, no electric signal can be supplied to the solenoids, resulting in a brake system failure.

SUMMARY OF THE INVENTION

In view of the aforesaid drawback of the conventional pressure control valve, it is an object of the present invention to provide a pressure control valve for use in an automobile braking system, which pressure control valve is capable of continuously controlling a hydraulic brake pressure supplied to a wheel cylinder of the automobile braking system in response to an applied electric signal, and also can allow the automotive brake system to perform its normal function even in the event of an electric failure, such as a wire disconnection, of the electric signal transmission system of the automobile braking system.

According to the present invention, there is provided a pressure control valve for use in an automobile braking system having a pressure fluid source, a wheel cylinder, and a reservoir, the pressure control valve comprising a slidable member slidably movable from a first position in which the pressure fluid source and the wheel cylinder communicates with each other through the slidable member for introducing a pressure fluid from the pressure fluid source into the wheel cylinder, through a second position in which the slidable member holds a fluid pressure in the wheel cylinder, to a third position in which the wheel cylinder communicates with the reservoir through the slidable member for discharging the pressure fluid from the wheel cylinder to the reservoir, pressure-bearing means associated with the slidable member for applying a first biasing force to the slidable member to urge the slidable member to the third position in response to the fluid pressure from the wheel cylinder, electromagnetic force generating means responsive to an electric signal for generating an electromagnetic force to urge the slidable member to the third position, biasing means for normally applying a second biasing force, greater than the first biasing force, to the slidable member to urge the slidable member to the first position, and means for regulating the fluid pressure in the wheel cylinder to cause the sum of the fluid pressure in the wheel cylinder and the electromagnetic force from the electromagnetic force generating means to counterbalance the second biasing force from the biasing means, whereby the fluid pressure in the wheel cylinder can be continuously controlled.

When no electric signal is applied to the electromagnetic force generating means, the slidable member is subjected to the first biasing force produced in response to the fluid pressure from the wheel cylinder and the second biasing force from the biasing means. Since the second biasing force is greater than the first biasing force, the slidable member is moved to the first position, bringing the pressure fluid source and the wheel cylinder into communication with each other.

When an electric signal is applied to the electromagnetic force generating means, the electromagnetic force is additionally applied to the slidable member. The slidable member is now shifted until the first biasing force, the second biasing force, and the electromagnetic force are counterbalanced. If the slidable member is located out of the second position, then the hydraulic braking pressure in the wheel cylinder varies, thus varying the first biasing force. The slidable member finally moves into the second position, bringing the first biasing force, the second biasing force, and the electromagnetic force into equilibrium.

Therefore, the hydraulic braking pressure in the wheel cylinder is uniquely determined and hence can be continuously controlled by the electric signal applied to the electromagnetic force generating means.

The above and other objects, features and advantages of the present invention will become more apparent from the following description when taken in conjunction with the accompanying drawings in which preferred embodiments of the present invention are shown by way of illustrative example.

DETAILED DESCRIPTION

Like or corresponding parts are denoted by like or corresponding reference numerals throughout views.

Figure 1:
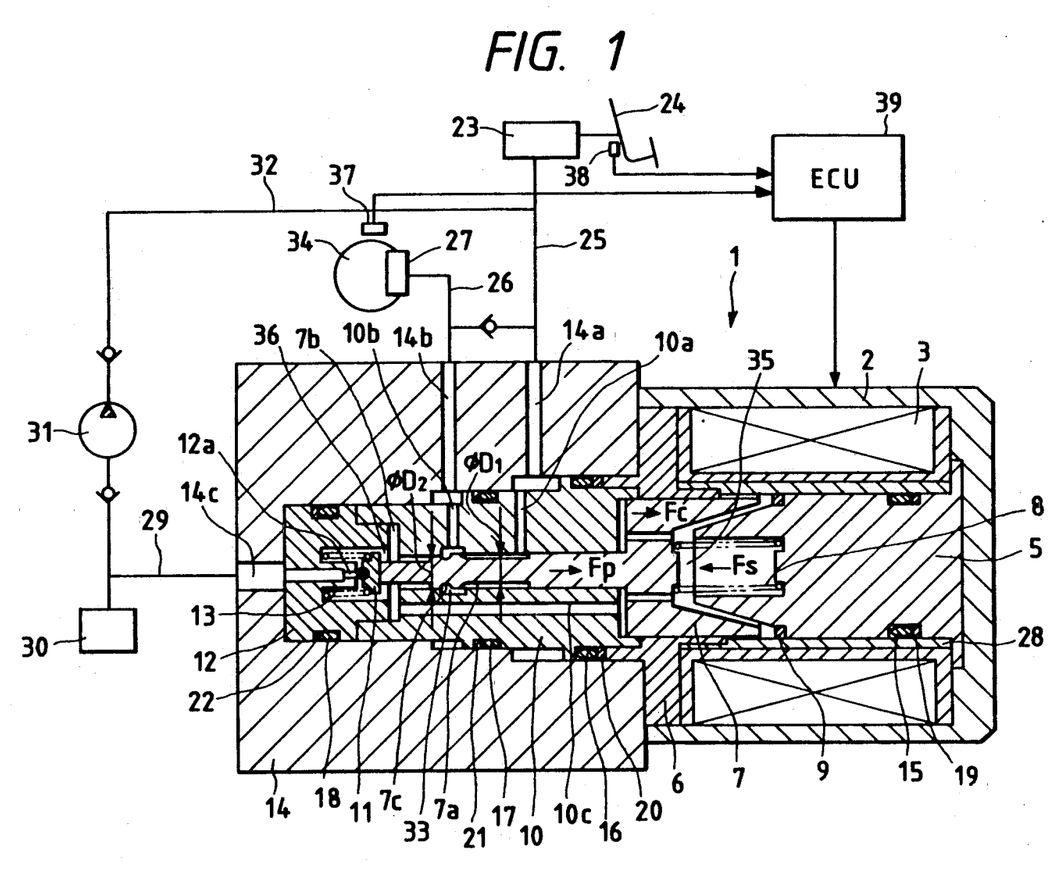
FIG. 1 is a cross-sectional view of a pressure control valve according to a first embodiment of the present invention, the pressure control valve being incorporated in an automobile anti-skid braking system.

FIG. 1 shows a pressure control valve, in cross section, according to a first embodiment of the present invention, and a hydraulic circuit arrangement of an automobile anti-skid braking system, in block form, particularly for one wheel of an automobile.

As shown in FIG. 1, the pressure control valve, generally designated by the reference numeral 1, is hydraulically connected to a master cylinder 23 actuatable by a brake pedal 24, a wheel cylinder 27 associated with an automobile wheel 34, and a reservoir 30 coupled to a hydraulic pump 31.

The master cylinder 23 communicates with an inlet port 14a of the pressure control valve 1 through a pipe 25, and the wheel cylinder 27 communicates with an outlet port 14b of the pressure control valve 1 through a pipe 26. The pressure control valve 1 also has a return port 14c communicating with the reservoir 30 through a pipe 29. A hydraulic brake fluid stored in the reservoir 30 is drawn by the pump 31 and returned through a pipe 32 to the master cylinder 23.

The pressure control valve 1 includes a cup-shaped housing 2 made of a magnetic material. The housing 2 is fastened to another housing 14 by bolts (not shown). The ports 14a, 14b, 14c are defined in the housing 14. The housing 2 accommodates therein an electromagnetic coil 3 disposed in a resin-molded case, a plate 6 of a magnetic material inserted in the housing 2 and held against an end of the coil 3, a cylindrical sleeve 28 of a nonmagnetic material disposed in the coil 3 and brazed to the plate 6, and a core 5 of a magnetic material disposed in the sleeve 28. The housing 14 accommodates a cylinder 10 disposed therein and a cap 12 held against an inner end of the cylinder 10. In the cylinder 10, there is slidably disposed a stepped spool 7 having axially spaced portions of different diameters D1, D2 (D1>D2).

The stepped spool 7 has two slots 7a, 7b defined in outer circumferential surfaces thereof. The inlet and outlet ports 14a, 14b can communicate with each other through the slot 7a and fluid passages 10a, 10b which are defined in the cylinder 10. The cylinder 10 also has a pressure chamber 33 defined therein at an end of the flow passage 10b near the stepped spool 7. A hydraulic brake pressure for the wheel cylinder 27 is introduced into the pressure chamber 33. The stepped spool 7 has a recess 7c defined in its outer periphery and opening into the pressure chamber 33. The axially spaced portions of different diameters D1, D2 are divided by a step which is defined by the recess 7c. The outlet port 14b and the return port 14c can communicate with each other through the fluid passage 10b, the pressure chamber 33, the slot 7b, a chamber 36 defined in the cap 12 and communicating with the slot 7b, and a fluid passage 12a defined in the cap 12. The chamber 36 communicates through a fluid passage 10c defined in the cylinder 10 with a chamber 35 which is defined axially between the stepped spool 7 and the core 5. Therefore, the same hydraulic pressure acts in the two chambers 35, 36 at all times.

The core 5 houses therein a spring 8 which acts on the stepped spool 7 for normally urging the stepped spool 7 to move in a leftward direction (FIG. 1). The stepped spool 7 supports on its lefthand end a shutoff valve 11 which holds the chamber 36 and the fluid passage 12a out of communication with each other under the bias of the spring 8. The shutoff valve 11 is also subjected to a rightward force from a spring 13, the force from the spring 13 being smaller than the force from the spring 8. When the stepped spool 7 moves to the right, the shutoff valve 11 also moves to the right while being pressed against the stepped spool 7 under the bias of the spring 13, thereby allowing communication between the chamber 36 and the fluid passage 12a.

A ring 9 of a nonmagnetic material is fixed to an outer step of the core 5 which faces the stepped spool 7. When the stepped spool 7 moves to the right under electromagnetic forces produced by the coil 3 as it is energized, the stepped spool 7 abuts against the ring 9, but not the core 5. If the stepped spool 7 were allowed to abut against the core 5, the stepped spool 7 would remain attracted to the core due to residual magnetism even after the coil 3 is de-energized. Since the cylindrical sleeve 28 is nonmagnetic, a magnetic path is established by the coil 3, the core 5, the stepped spool 7, and the plate 6, allowing the electromagnetic forces from the coil 3 to act effectively on the stepped spool 7.

An O-ring 15 and a backup ring 19 are disposed between the core 5 and the sleeve 28. O-rings 16, 17 and backup rings 20, 21 are disposed between the cylinder 10 and the housing 14. An O-ring 18 and a backup ring 22 are disposed between the cap 12 and the housing 14.

The wheel 34 is associated with a wheel speed sensor 37 which generates a pulsed signal depending on the rotational speed of the wheel 34. The brake pedal 24 is associated with a brake switch 34 which is turned on only when the brake pedal 24 is stepped on. Output signals from the wheel speed sensor 37 and the brake switch 34 are supplied to an electronic control unit (ECU) 39. Based on the supplied signals, the ECU 39 calculates the rotational speed of the wheel 34 and determines a locked condition of the wheel 34, and then supplied a drive signal to the coil 3 of the pressure control valve 1 to regulate the hydraulic brake pressure to be supplied to the wheel cylinder 27.

Operation of the automobile anti-skid braking system shown in FIG. 1, including the pressure control valve 1, will be described below.

(i) Normal Braking Mode

When the wheel 34 is braked normally, the coil 3 is not energized and hence no electromagnetic forces are produced thereby. The stepped spool 7 and the shutoff valve 11 are pressed to the left under the resiliency of the spring 8, closing the fluid passage 12a with the shutoff valve 11. The hydraulic braking pressure which is produced by the master cylinder 23 when the brake pedal 24 is depressed flows through the pipe 25, the inlet port 14a, the fluid passage 10a, and the slot 7a into the pressure chamber 33, and then through the fluid passage 10b, the outlet port 14b, and the pipe 26 into the wheel cylinder 27. At this time, the slot 7b does not communicate directly with the pressure chamber 33. However, since the braking fluid leaks through the clearance between the cylinder 10 and the stepped spool 7 which is axially slidable therein, the slots 7a, 7b and the chambers 33, 36 are maintained under the same fluid pressure as the hydraulic braking pressure in the wheel cylinder 27. The braking fluid does not flow from the pressure control valve 1 into the reservoir 30 because the fluid passage 12a connected through the return passage 14c to the reservoir 30 is positively closed by the shutoff valve 11.

(ii) Anti-Skid Braking Mode

When the wheel 34 is likely to lock up by a braking action while the automobile is running, an anti-skid braking mode is initiated, and the pressure control valve 1 regulates the hydraulic braking pressure to be supplied to the wheel cylinder 27. More specifically, the coil 3 is energized to produce a electromagnetic attractive force Fc to move the stepped spool 7 to the right (FIG. 1). When the stepped spool 7 moves to the right, the shutoff valve 11 also moves to the right under the bias of the spring 13, thus opening the fluid passage 12a which communicates with the return port 14c. The chamber 36 is therefore brought into communication with the reservoir 30. Consequently, the hydraulic pressure in the chamber 36 and the chamber 35 which communicates with the chamber 36 through the fluid passage 10c drops down to zero, so that the hydraulic braking pressure in the wheel cylinder 27 is reduced.

At this time, the hydraulic braking pressure in the wheel cylinder 27, i.e., the hydraulic pressure in the pressure chamber 33, is regulated as follows:

As described above, the diameter D1 of the portion of the stepped spool 7 which is on the righthand side of the recess 7c is greater than the diameter D2 of the portion of the stepped spool 7 which is on the lefthand of the recess 7c. Therefore, the hydraulic pressure in the pressure chamber 33, i.e., the hydraulic braking pressure Pw/c in the wheel cylinder 27, acts on the difference $A = (D1^2 - D2^2) \cdot \pi/4$ between the cross-sectional areas of the smaller- and larger-diameter portions of the stepped spool 7. The stepped spool 7 is now subjected to a rightward force $Fp = Pw/c \cdot A$ which depends on the hydraulic braking force Pw/c applied to the wheel cylinder 27. At the same time, the stepped spool 7 is subjected to the rightward electromagnetic force Fc produced by the coil 3, as described above, and also to a combined force Fs from the springs 8, 18 (=the biasing force from the spring 8—the biasing force from the spring 13). The stepped spool 7 moves into a stable position until the sum of the forces Fp, Fc is equalized to, i.e., counterbalances, the force Fs (Fp+Fc=Fs). When the stepped spool 7 is stopped in equilibrium, the hydraulic braking force Pw/c in the wheel cylinder 27 is uniquely determined depending on the electromagnetic force Fc according to the following equation:

$$Pw/c = (Fs - Fc)/A.$$

The stepped spool 7 is automatically moved until the state of balance as defined by the above equation is reached. The automatic movement of the stepped spool 7 will be described below in greater detail with reference to FIGS. 2A, 2B, and 2C.

Figure 2A:
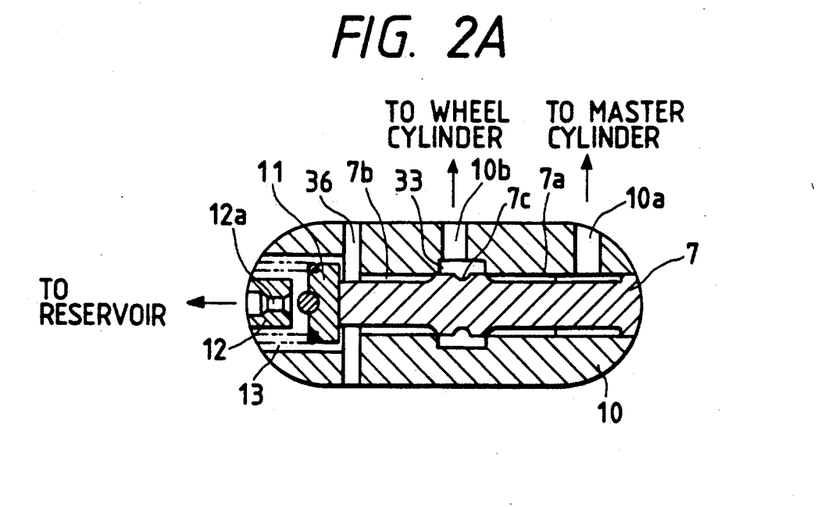
FIGS. 2A, 2B, and 2C are fragmentary cross-sectional views showing the manner in which the pressure control valve shown in FIG. 1 operates.
Figure 2B:
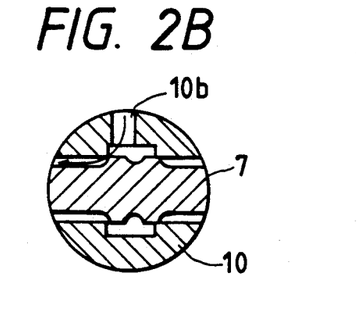
Figure 2C:
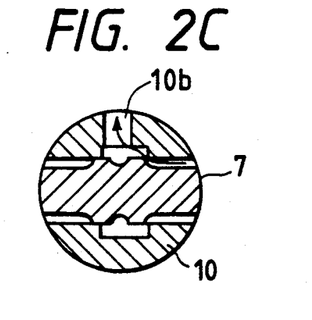

FIGS. 2A, 2B, and 2C show the pressure chamber 33 and surrounding parts at enlarged scale. When the hydraulic braking pressure Pw/c satisfies the above equation, the stepped spool 7 is positioned as shown in FIG. 2A. When the hydraulic braking pressure Pw/c is higher than the force indicated by the righthand side of the above equation, the stepped spool 7 is positioned as shown in FIG. 2B. When the hydraulic braking pressure Pw/c is lower than the force indicated by the righthand side of the above equation, the stepped spool 7 is positioned as shown in FIG. 2C.

When the hydraulic braking force Pw/c satisfies the above equation, the pressure chamber 33 does not communicate directly with both the slots 7a, 7b of the spool 7, as shown in FIG. 2A, so that the hydraulic braking pressure Pw/c is kept at a constant level. At this time, a small amount of braking fluid actually flows into and out of the chamber 33 through the clearance between the stepped spool 7 and the cylinder 10. However, since the hydraulic pressure in the pressure chamber 33 is kept constant, no braking fluid can apparently be regarded as flowing into and out of the pressure chamber 33.

If the electromagnetic force Fc is increased, the forces are brought out of the state of balance as defined by the above equation, and the stepped spool 7 is moved to the right as shown in FIG. 2B. The slot 7b communicates with the pressure chamber 33, allowing the braking fluid to flow from the pressure chamber 33 through the slot 7b, the chamber 36, the fluid passage 12a, the return port 14c, and the pipe 29 into the reservoir 30. Therefore, the hydraulic braking pressure Pw/c acting in the pressure chamber 33 is reduced, thereby reducing the force which pushes the stepped spool 7 to the right. Then, the stepped spool 7 starts to move gradually to the left. As the hydraulic braking pressure Pw/c is reduced until the above equation is satisfied, the stepped spool 7 moves back to the position shown in FIG. 2A, keeping the hydraulic braking pressure Pw/c constant again.

Conversely, if the electromagnetic force Fc is reduced, the stepped spool 7 is moved to the left as shown in FIG. 2C, bringing the slot 7b into communication with the pressure chamber 33. The braking fluid flows from the master cylinder 23 through the slot 7a into the pressure chamber 33, resulting in an increase in the hydraulic braking pressure Pw/c in the pressure chamber 33. The pressure buildup in the pressure chamber 33 then increases the force tending to push the stepped spool 7 to the right, whereupon the stepped spool 7 starts to move gradually to the right. As the hydraulic braking pressure Pw/c is increased until the above equation is satisfied, the stepped spool 7 moves back to the position shown in FIG. 2A, keeping the hydraulic braking pressure Pw/c constant again.

As can be understood from the above description with reference to FIGS. 2A, 2B, and 2C, the hydraulic braking pressure Pw/c can be controlled by the electromagnetic force Fc. In the anti-skid braking mode, when the wheel 34 shows a greater sign of wheel locking, i.e., a stronger wheel locking tendency, the electromagnetic force Fc is increased to lower the hydraulic braking pressure Pw/c to be applied to the wheel cylinder 27, and when the wheel 34 shows smaller signs of locking, the electromagnetic force Fc is reduced to increase the hydraulic braking pressure Pw/c to be applied to the wheel cylinder 27. The slip ratio of the wheel 34 can be maintained at an appropriate level through the above control process, using the pressure control valve 1.

In the above embodiment, the electromagnetic force Fc is controlled by an electric current supplied to the coil 3. In the anti-skid braking mode, the pump 31 is actuated at all times to return the braking fluid discharged into the reservoir 30 to the master cylinder 23.

Since the hydraulic braking pressure Pw/c is continuously controlled by the pressure control valve 1, any noise which would otherwise be produced by sudden changes in pressure or shocks which would otherwise be transmitted to the brake pedal 24 can be reduced.

The shutoff valve 11 serves to prevent any braking fluid which has leaked through the clearance between the stepped spool 7 and the cylinder 10, from flowing into the reservoir 30. The shutoff valve 11 reliably closes the fluid passage 12a communicating with the reservoir 30 under the bias of the spring 8 when the coil 3 is de-energized. Therefore, inasmuch as no braking fluid is discharged from the pressure control valve 1 into the reservoir 30 in the normal braking mode, the braking pressure in the normal braking mode is not reduced, and hence the braking performance of the braking system is not impaired in the normal braking mode. The pump 31 may be actuated only in the anti-skid braking mode because the braking fluid is discharged into the reservoir 30 only in the anti-skid braking mode.

Figure 3:
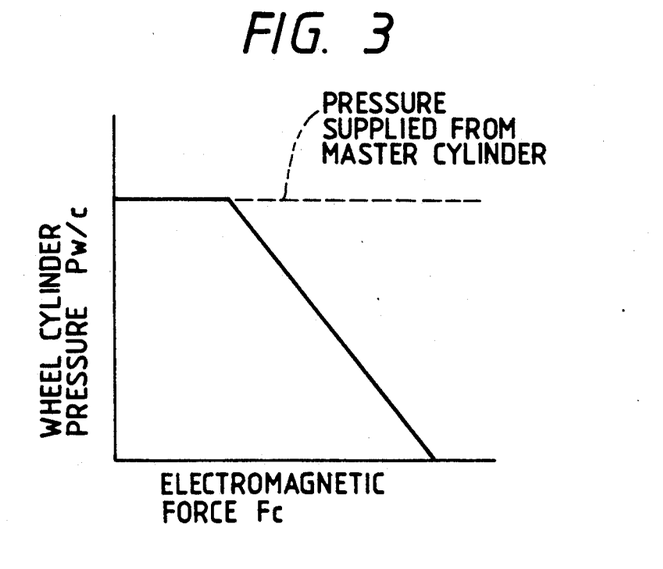
FIG. 3 is a diagram showing the relationship between an electromagnetic force produced by the pressure control valve shown in FIG. 1 and a hydraulic braking pressure in a wheel cylinder.

Furthermore, as shown in FIG. 3, the electromagnetic force Fc and the hydraulic braking pressure Pw/c in the wheel cylinder 27 are related such that when the electromagnetic force Fc is zero, the hydraulic braking pressure Pw/c in the wheel cylinder 27 is equal to the hydraulic pressure from the master cylinder 23, and as the electromagnetic force Fc increases, the hydraulic braking pressure Pw/c decreases. In the event of a failure of the coil 3, such as a wire disconnection of the coil 3 or the electric signal transmission system of the braking system, therefore, the hydraulic pressure from the master cylinder 23 is still able to act on the wheel cylinder 27, allowing the braking system to perform its function.

Figure 4:
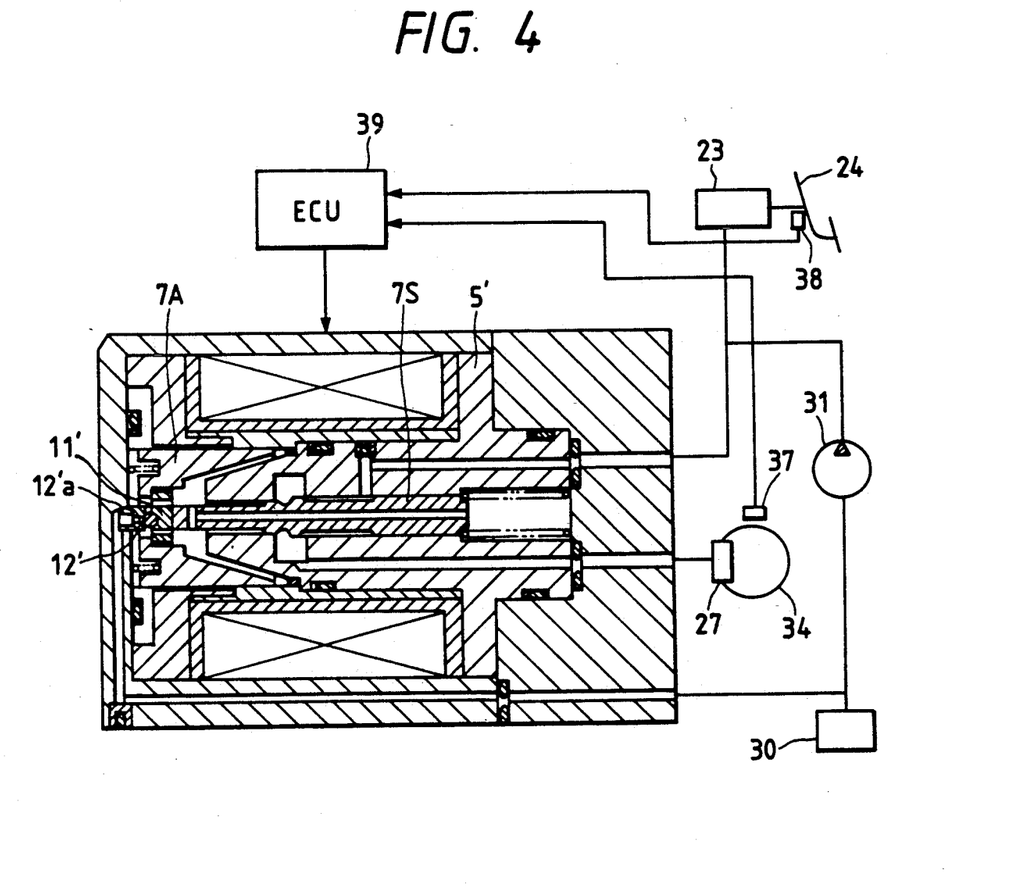
FIG. 4 is a cross-sectional view of a pressure control valve according to a second embodiment of the present invention.

FIG. 4 shows a pressure control valve according to a second embodiment of the present invention. The pressure control valve shown in FIG. 4 includes a spool assembly composed of a spool 7S and an armature 7A, with the spool 7S being slidably disposed in a core 5', and a shutoff valve 11' disposed between the spool 7S and the armature 7A. The pressure control valve shown in FIG. 4 is smaller in size than the pressure control valve shown in FIG. 1. When the armature 7A moves to the right under electromagnetic attractive forces, the shutoff valve 11' held against the armature 7A also moves to the right, thereby opening a fluid passage 12'a defined in a cap 12' and communicating with the return port. Upon the rightward movement of the armature 7A and the shutoff valve 11', the spool 7S held against the shutoff valve 11' also moves to the right, so that the hydraulic braking pressure applied to the wheel cylinder can be regulated.

Figure 5:
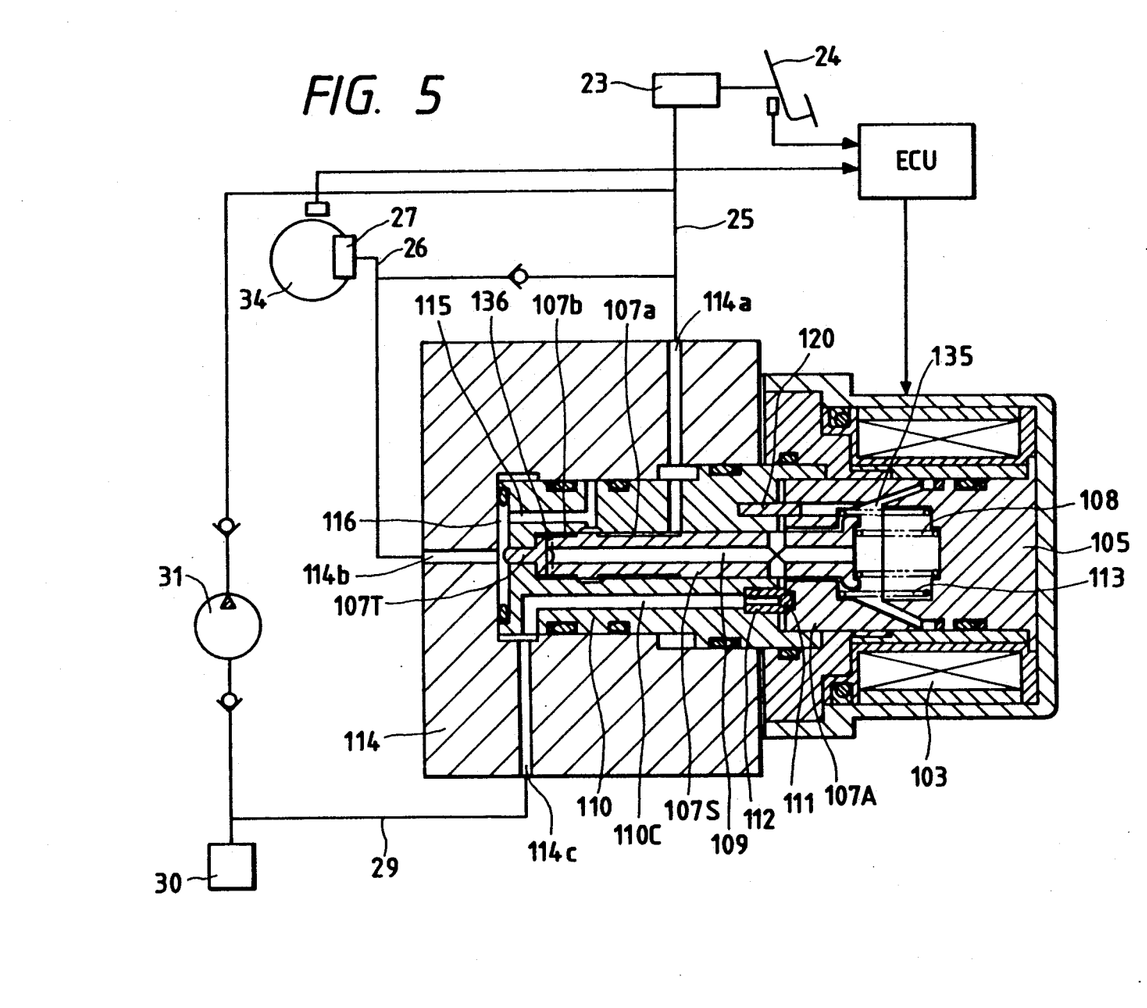
FIG. 5 is a cross-sectional view of a pressure control valve according to a third embodiment of the present invention.

FIG. 5 shows a pressure control valve according to a third embodiment of the present invention.

The pressure control valve shown in FIG. 5 has a spool assembly composed of a spool 107S and an armature 107A, and is arranged such that the hydraulic braking pressure in the wheel cylinder acts on one end of the spool 107S and the bias forces of springs 108, 113 act in one direction on the spool 7S and the armature 7A.

The above arrangement of the pressure control valve shown in FIG. 5 allows the coil 3 to be reduced in size, the braking system to be more reliable in operation, and the pressure valve to be manufactured more easily.

The pressure control valve shown in FIG. 5 will be described in detail with respect to its structure and operation.

A pressure-bearing member 107T is held against one end of the spool 107S and has a projecting end exposed in a fluid passage 116 which is defined in a housing 114 by a cylinder 110 disposed therein. The fluid passage 116 is supplied with the hydraulic braking pressure from the wheel cylinder 27 through the pipe 26 and an outlet port 114b defined in the housing 114. The pressure-bearing member 107T is subjected to a rightward force (FIG. 5) under the hydraulic braking pressure supplied to the fluid passage 116. The force thus applied to the pressure-bearing member 107T acts on the spool 107S, urging the spool 107S to move to the right. A spring 108 acting on the other end of the spool 107S applies a force to the spool 107S in a direction opposite to the force from the pressure-bearing member 107T. The force from the spring 108 is greater than the force which is produced by the hydraulic braking pressure that is applied through the pressure-bearing member 107T to the spool 107S. Therefore, the spool 107S is normally urged to the left. Under this condition, the master cylinder 23 and the wheel cylinder 27 are held in communication with each other through the pipe 25, an inlet port 114a defined in the housing 114, a slot 107a defined in the spool 107S, a fluid passage 115 defined in the cylinder 110, the fluid passage 116, the outlet port 114b, and the pipe 26. Therefore, the braking system shown in FIG. 5 operates in the normal braking mode.

The spool 107S has a fluid passage 109 defined axially therethrough and communicating with a slot 107b defined in the spool 107S through a communication hole 136 that is defined diametrically in the spool 107S. The fluid passage 109 also communicates with a chamber 135 defined between the spool 107S and a core 105 in an electromagnetic coil 103. When a shutoff valve 111 is opened, the fluid passage 109 also with a fluid passage 110c defined in the cylinder 110 and communicating with a return port 114c defined in the housing 114. The shutoff valve 111 has a valve body fixed to the armature 107A and a valve seat 112 press-fitted in an end of the fluid passage 113. A stopper 120 has one end press-fitted in the cylinder 110 and the other end axially slidably inserted in the armature 107A with a certain clearance therebetween. When the armature 107A is axially moved with respect to the cylinder 114 under electromagnetic forces from the coil 103, the stopper 120 prevents the armature 107A from rotating about its own axis and hence the valve body of the shutoff valve 111 from being dislodged off the valve seat 112.

The spool 107S extends axially through the armature 107A. Only a stepped end of the spool 107S, which is disposed in the chamber 135, engages the armature 107. When the coil 103 is energized to attract the armature 107A to the right under an electromagnetic force, the armature 107A and the spool 107S move in unison with each other. The armature 107A is normally urged to the left by a spring 113 which is disposed around the spring 108. Therefore, when the coil 103 is de-energized, the armature 107A is pressed to the left under the bias of the spring 113.

The pressure control valve shown in FIG. 5 operates as follows:

When the coil 103 is energized, the armature 107A and the spool 107S move into a stable position in which the sum of the electromagnetic attractive force from the coil 103 and the hydraulic braking pressure from the wheel cylinder 27 counterbalances the forces from the springs 108, 113. If the slots 107a, 107b and the fluid passage 115 are not blocked at this time, then the hydraulic braking pressure in the wheel cylinder 27 is increased or reduced. The change in the hydraulic braking pressure in the wheel cylinder 27 causes the spool 107S to move into the stable position until finally the slots 107a, 107b and the fluid passage 115 are blocked (actually the same amount of braking fluid flows into and out of the fluid passage 115 through the clearance between the spool 107S and the cylinder 110. As with the pressure control valve 1 according to the first embodiment, the hydraulic braking pressure in the wheel cylinder 27 is uniquely determined by the electromagnetic force produced by the coil 103 and can continuously be controlled thereby.

In the pressure control valve 1 according to the first embodiment, when the chamber 36 and the fluid passage 12a are held out of communication with each other, the shutoff valve 11 is subjected to a leftward direction (FIG. 1) under the hydraulic braking pressure introduced in the chamber 36 because substantially no hydraulic pressure acts on the surface of the shutoff valve 11 which faces the fluid passage 12a communicating with the reservoir 30 and the hydraulic braking pressure introduced in the chamber 36 acts on the surface of the shutoff valve 11 which faces the chamber 36. Therefore, the force of the spring 13 must be strong enough to move the shutoff valve 11 even when the high-pressure braking fluid is introduced into the chamber 33. The force of the spring 8 which urges the spool 7 against the force of the spring 13 needs to be strong as well. As a result, the coil 3 must be large in size or consume a large electric current in order to produce an electromagnetic force which is strong enough to move the spool 7 against the bias of the spring 8.

According to the third embodiment shown in FIG. 5, however, the force of the spring 108 is required to be only larger than the force which acts on the spool 107S under the hydraulic braking pressure from the wheel cylinder 27. The spring 113 may be of a small force as it only needs to push the armature 107A to the left (FIG. 5). Therefore, the electromagnetic force produced by the coil 103 for moving the spool 107S and the armature 107A may be relatively small, and hence the coil 103 may be reduced in size and consume a relatively small electric current.

Moreover, even if the spring 108 is damaged or otherwise fails to function properly, the shutoff valve 111 will not be opened since the armature 107A remains to be pressed to the left by the spring 113. If the spring 113 fails or both the springs 108, 113 fail, the shutoff valve 111 remains to be closed because the hydraulic pressure acting on the surface of the shutoff valve 111 which faces the fluid passage 113 communicating with the reservoir 30 is substantially zero whereas the hydraulic braking pressure introduced in the chamber 135 is applied to the surface of the armature 107A that faces the chamber 135.

As described above, unless the coil 103 is energized to produce the electromagnetic force, the shutoff valve 111 is not opened. Consequently, even if the springs 108, 113 are damaged or fail to function properly, the braking fluid is prevented from flowing into the reservoir 30 through the shutoff valve 111, so that the braking system operates highly reliably.

According to the first embodiment shown in FIG. 1, the the spool 7 has different-diameter portions one on each side of the recess 7c, and the hydraulic braking pressure in the wheel cylinder 27 is borne by the difference between the cross-sectional areas of the different-diameter portions of the spool 7. Therefore, the space in which the spool 7 slidably moves in the cylinder 10 is required to have corresponding different-diameter portions. It is however quite difficult to machine and produce the different-diameter portions of the spool 7 and the cylinder 10.

According to the third embodiment shown in FIG. 5, however, the spool 107S and the pressure-bearing member 107T are separate members, they can easily be machined and produced.

Figure 6:
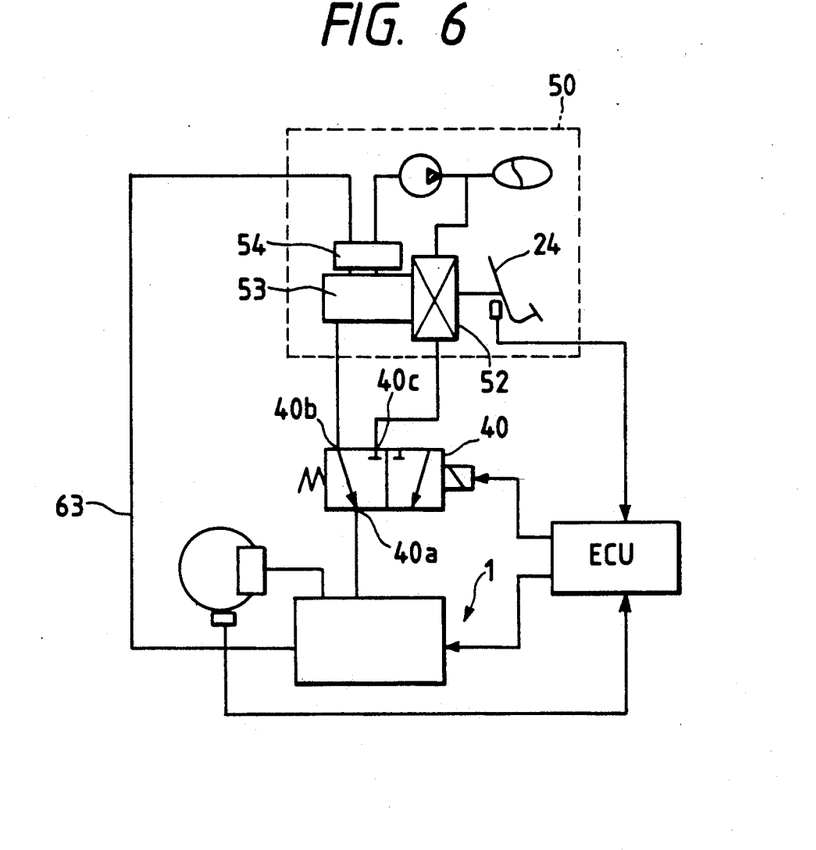
FIG. 6 is a block diagram of another automobile anti-skid braking system which incorporates a pressure control valve according to the present invention.

FIG. 6 shows in block form another automobile anti-skid braking system which incorporates a pressure control valve according to the present invention, the automobile anti-skid braking system having a hydraulic booster.

The automobile anti-skid braking system includes a braking pressure generator assembly 50 including a hydraulic pressure booster 52. The braking pressure generator assembly 50 is hydraulically connected to a pressure control valve 1 through a solenoid-operated directional control valve 40 which has a port 40a connected to the pressure control valve 1, a port 40b connected to a master cylinder 53, and a port 40c connected to the hydraulic pressure booster 52. While in the anti-skid braking mode, the hydraulic pressure booster 52 is brought into communication with the pressure control valve 1 through the solenoid-operated directional control valve 40, so that the hydraulic pressure booster 52 supplies a braking fluid required to regulate the hydraulic braking pressure in the wheel cylinder. The hydraulic pressure supplied from the hydraulic pressure booster 52 is regulated so that it corresponds to the hydraulic braking pressure from the master cylinder 53. The braking fluid discharged from the pressure control valve returns to a reservoir 54 of the braking pressure generator assembly 50 through a pipe 63.

The pressure control valve according to the present invention may be incorporated in an open-loop-type anti-skid braking system as well as the closed-loop-type anti-skid braking system according to the first embodiment, wherein the braking fluid circulates in the system. In the case where the pressure control valve is incorporated in an open-loop-type anti-skid braking system, no pressure pulsations are produced, making it effective to reduce noise during operation of the braking system and also to reduce a kickback on the brake pedal.

Figure 8:
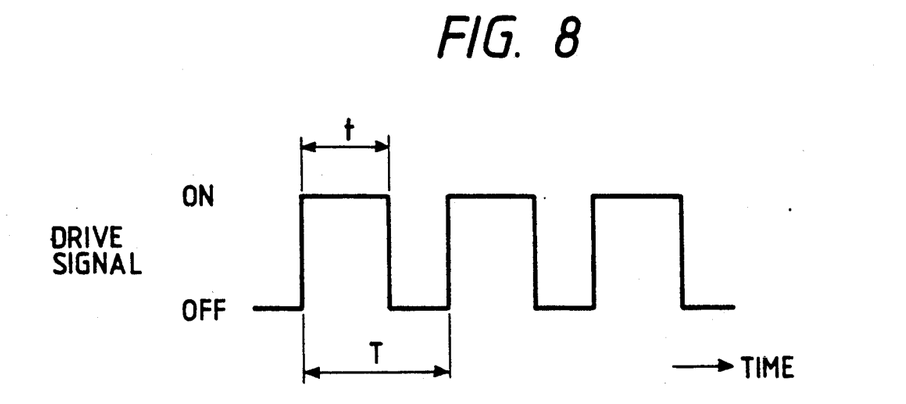
FIG. 8 is a diagram showing the waveform of a drive signal applied to actuate the pressure control valve under duty cycle control.

In the above embodiments, the electromagnetic force Fc is controlled by the electric current supplied to the electromagnetic coil. However, the electromagnetic oil may be energized by a pulse drive signal as shown in FIG. 8, and the duty cycle t/T (e.g., 1 msec.<T<100 msec.) of the pulse drive signal may be controlled to control the electromagnetic force Fc.

Figure 7:
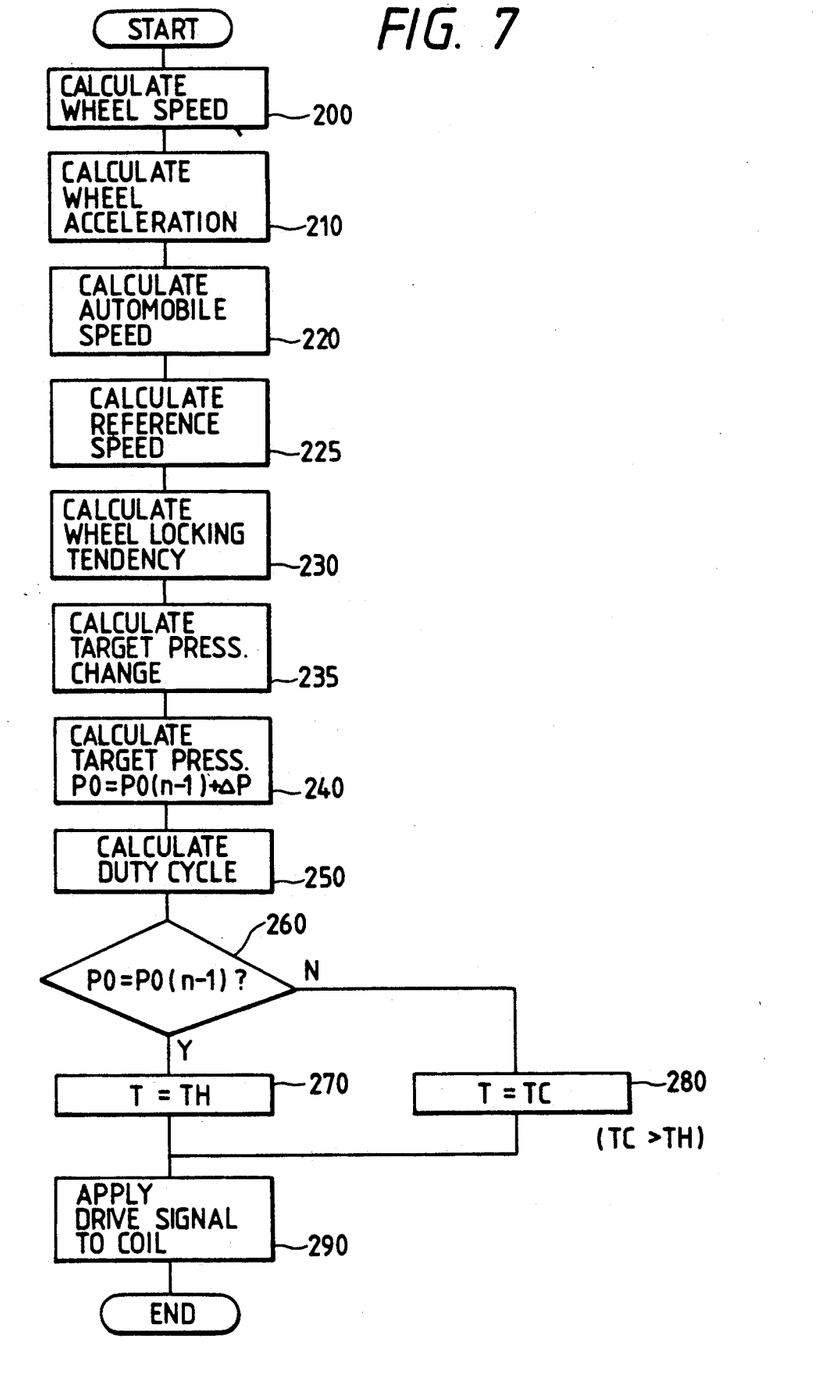
FIG. 7 is a flowchart of of a control sequence for actuating a pressure control valve according to the present invention under duty cycle control.

FIG. 7 shows a control sequence for actuating a pressure control valve according to the present invention with such a pulse drive signal. The control sequence shown in FIG. 7 is executed in each predetermined period of time (e.g., 5 msec.) with respect to each of the wheels of an automobile which incorporates the antilock braking system with the control pressure valve.

A step 200 calculates a wheel speed Vw based on a detected signal from the wheel speed sensor 37 (FIG. 1). Then, a step 210 calculates a wheel acceleration V̇w based on the wheel speed Vw calculated in the step 200, and a step 220 calculates an automobile speed Vb based on the wheel speed Vw calculated in the step 200. A step 225 calculates a reference speed Vs for determining a sign of wheel locking, i.e., a wheel locking tendency, based on the automobile speed Vb according to the following equation:

$$Vs = K3 \cdot Vb - K4.$$

A step 230 then calculates a locking parameter W representing the wheel locking tendency based on the wheel speed Vw, the wheel acceleration V̇w, and the reference speed Vs according to the following equation:

$$W = K1(Vw - Vs) + K2 \cdot V̇w.$$

A step 235 compares the absolute value of the locking parameter W and a predetermined value A, and, if the absolute value of the locking parameter W is greater than the predetermined value A, calculates a target hydraulic pressure change ΔP according to the following equation:

$$\Delta P = K5 \cdot W.$$

If the absolute value of the locking parameter W is smaller than the predetermined value A, the target hydraulic pressure change ΔP is set to zero. In a step 240, a target hydraulic braking pressure P0 for the wheel cylinder 27 is calculated, using the target hydraulic pressure change ΔP, according to the equation:

$$P0 = P0(n-1) + \Delta P$$

where P0(n−1) is a target hydraulic braking pressure calculated in a previous cycle.

Based on the target hydraulic braking pressure P0 calculated in the step 240, the duty cycle of a drive signal to be supplied to the electromagnetic coil of the pressure control valve is calculated in a step 250. Then, a step 260 determines whether the presently calculated target hydraulic braking pressure P0 is equal to the previously calculated target hydraulic braking pressure P0(n−1) or not. If the presently calculated target hydraulic braking pressure P0 is equal to the previously calculated target hydraulic braking pressure P0(n−1), indicating that the absolute value of the locking parameter W is smaller than the predetermined value A, i.e., the wheel has a smaller locking tendency, then the period T of the pulse drive signal is set to a first period TH in a step 270. If the presently calculated target hydraulic braking pressure P0 is different from the previously calculated target hydraulic braking pressure P0(n−1), indicating that the wheel has a larger locking tendency, then the period T of the pulse drive signal is set to a second period TC in a step 280. The first period TH is shorter than the second period TC.

Therefore, if the wheel locking tendency is smaller and it is not necessary to change the target hydraulic braking pressure P0, the frequency of the pulse drive signal is increased, so that the spool (and the armature) is stably driven by an average current of the pulse drive signal supplied to the coil. Consequently, the amount of braking fluid flowing through the clearance between the spool and the cylinder is reduced, and so is the amount of braking fluid discharged into the reservoir. If the wheel locking tendency is larger and it is necessary to change the target hydraulic braking pressure P0, the frequency of the pulse drive signal is reduced, so that the spool (and the armature) is driven while being axially vibrated a small stroke. Accordingly, when the target hydraulic braking pressure P0 is changed, the hysteretical behavior of the spool (and the armature) when it is driven is reduced. More specifically, when the spool (and the armature) is moved, it is subjected to a resistance, which is maximum at the time the spool (and the armature) starts moving. Because the spool (and the armature) is driven while being axially vibrated a small stroke when the target hydraulic braking pressure P0 is changed, the resistance applied to the spool (and the armature) is reduced, thus reducing the hysteretical behavior of the spool (and the armature) as it is driven.

In a step 290, a pulse drive signal based on the duty cycle calculated in the step 250 and the period T established in the step 270 or 280 is applied to the electromagnetic coil.

As described above, the pressure control valve according to the present invention can continuously control the hydraulic braking pressure applied to the wheel cylinder based on the electric signal supplied to the pressure control valve. Furthermore, even in the event of an electric failure, such as a wire disconnection, of the electric signal transmission system, the pressure control valve allows the braking system to perform its normal braking function.

Although certain preferred embodiments have been shown and described, it should be understood that many changes and modifications may be made therein without departing from the scope of the appended claims.

We claim as our invention:

1. A pressure control valve for use in an automobile braking system having a pressure fluid source, a wheel cylinder, and a reservoir, said pressure control valve comprising:

a slidable member slidably movable from a first position in which the pressure fluid source and the wheel cylinder communicate with each other through the slidable member for introducing a pressure fluid from the pressure fluid source into the wheel cylinder, through a second position in which the slidably member holds a fluid pressure in the wheel cylinder, to a third position in which the wheel cylinder communicates with the reservoir through the slidable member for discharging the pressure fluid from the wheel cylinder to the reservoir;

pressure-bearing means associated with said slidable member for applying a first biasing force to said slidably member to urge the slidable member to said third position in response to the fluid pressure from the wheel cylinder;

electromagnetic force generating means responsive to an electric signal for generating an electromagnetic force to urge said slidable member to said third position;

biasing means for normally applying a second biasing force, greater than said first biasing force, to said slidable member to urge the slidable member to said first position; and electric signal supply means for supplying said electromagnetic force generating means with an electric signal to regulate the fluid pressure in the wheel cylinder to cause the sum of the fluid pressure in the wheel cylinder and the electromagnetic force from said electromagnetic force generating means to counterbalance said second biasing force from said biasing means, whereby the fluid pressure in the wheel cylinder is continuously controlled.

2. A pressure control valve according to claim 1, wherein said slidable member includes two portions having different diameters with a step therebetween, said pressure-bearing means comprising said step.

3. A pressure control valve according to claim 1, wherein said pressure-bearing means comprises a pressure-bearing member disposed on an end of said slidable member, said pressure-bearing member being separate from said slidable member.

4. A pressure control valve according to claim 1, further including a fluid passage for providing fluid communication between the wheel cylinder and the reservoir, and valve means for closing said fluid passage when said slidable member is in said first position and for opening said fluid passage when said slidable member is moved from said first position to said third position.

5. A pressure control valve according to claim 1, wherein said slidable member comprises a first element movable between said first, second, and third positions, and a second element movable under the electromagnetic force from said electromagnetic force generating means, said first element being separate from and extending through said second element, whereby, when the electromagnetic force from said electromagnetic force generating means is applied to said second element, said second element urges said first element for sliding movement therewith.

6. A pressure control valve according to claim 5, wherein said biasing means comprises a first spring for normally biasing said first element to said first position and a second spring for normally biasing said second element to said first position.

7. A pressure control valve according to claim 1, wherein said slidable member comprises a first element movable between said first, second, and third positions, and a second element movable under the electromagnetic force from said electromagnetic force generating means, the arrangement being such that when the electromagnetic force from said electromagnetic force generating means is applied to said second element, said second element urges said first element for sliding movement therewith to said third position, and further including a fluid passage for providing fluid communication between the wheel cylinder and the reservoir, and valve means for closing said fluid passage when said second element is subjected to no electromagnetic force and for opening said fluid passage when said second element is moved under the electromagnetic force.

8. An automobile braking system in an automobile having a road wheel, a pressure fluid source, a wheel cylinder associated with the road wheel, and a reservoir, comprising:

speed detecting means for detecting a rotational speed of the road wheel and producing a speed signal indicative of the detected rotational speed;

decision means for determining a locking tendency of the road wheel based on at least said speed signal;

a pressure control valve connected to said pressure fluid source, said wheel cylinder, and said reservoir, for continuously controlling a fluid pressure applied to said wheel cylinder;

said pressure control valve comprising a slidable member slidably movable from a first position in which said pressure fluid source and said wheel cylinder communicate with each other through said slidable member for introducing a pressure fluid from said pressure fluid source into said wheel cylinder, through a second position in which said slidable member holds a fluid pressure in said wheel cylinder, to a third position in which said wheel cylinder communicates with said reservoir through said slidable member for discharging the pressure fluid from said wheel cylinder to said reservoir, pressure-bearing means associated with said slidable member for applying a first biasing force to said slidable member to urge the slidable member to said third position in response to the fluid pressure from said wheel cylinder, electromagnetic force generating means responsive to an electric signal for generating an electromagnetic force to urge said slidable member to said third position, and biasing means for normally applying a second biasing force, greater than said first biasing force, to said slidable member to urge the slidable member to said first position; and electric signal supply means for supplying said electromagnetic force generating means with an electric signal to cause said electromagnetic force generating means to generate a greater electromagnetic force as the locking tendency of the road wheel as detected by said decision means becomes greater, whereby the fluid pressure in the wheel cylinder is continuously controlled such that the sum of said first biasing force and said electromagnetic force is counter balanced with said second biasing force.

9. An automobile braking system according to claim 8, wherein said electric signal comprises a pulse drive signal, said electric signal supply means comprising means for increasing a duty cycle of the pulse drive signal as the locking tendency of the road wheel becomes greater.

10. An automobile braking system according to claim 8, wherein said electric signal comprises a pulse drive signal, said electric signal supply means comprising means for reducing a period of the pulse drive signal as the locking tendency of the road wheel becomes greater.

11. An automobile braking system in an automobile having a road wheel and a brake pedal, comprising:

a pressure fluid source for supplying a pressure fluid in response to the depression of the brake pedal;

a wheel cylinder for braking the road wheel when supplied with the pressure fluid from said pressure fluid source;

a reservoir for storing the pressure fluid discharged from said wheel cylinder;

a pump for delivering the fluid pressure from said reservoir under pressure to said pressure fluid source;

a pressure control valve connected to said pressure fluid source, said wheel cylinder, and said reservoir, for continuously controlling a fluid pressure applied to said wheel cylinder;

said pressure control valve comprising a slidable member slidably movable from a first position in which said pressure fluid source and said wheel cylinder communicate with each other through said slidable member for introducing a pressure fluid from said pressure fluid source into said wheel cylinder, through a second position in which said slidable member holds a fluid pressure in said wheel cylinder, to a third position in which said wheel cylinder communicates with said reservoir through said slidable member for discharging the pressure fluid from said wheel cylinder to said reservoir, pressure-bearing means associated with said slidable member for applying a first biasing force to said slidable member to urge the slidable member to said third position in response to the fluid pressure from said wheel cylinder, electromagnetic force generating means responsive to an electric signal for generating means responsive to an electric signal for generating an electromagnetic force to urge said slidable member to said third position, and biasing means for normally applying a second biasing force, greater than said first biasing force, to said slidable member to urge the slidable member to said first position, whereby the fluid pressure in the wheel cylinder is continuously controlled such that the sum of said first biasing force and said electromagnetic force is counter balanced with said second biasing force.

* * * * *